US012573819B2

(12) United States Patent
Pham et al.

(10) Patent No.: US 12,573,819 B2
(45) Date of Patent: Mar. 10, 2026

(54) PROTECTION DEVICE AGAINST PULSED CURRENTS

(71) Applicant: CITEL, Sevres Cedex (FR)

(72) Inventors: Cong Duc Pham, Reims (FR); Vincent Crevenat, Reims (FR); Vincent Lapauw, Reims (FR); Yves Gannac, Reims (FR)

(73) Assignee: CITEL, Sevres Cedex (FR)

( * ) Notice: Subject to any disclaimer, the term of this patent is extended or adjusted under 35 U.S.C. 154(b) by 305 days.

(21) Appl. No.: 18/218,637

(22) Filed: Jul. 6, 2023

(65) Prior Publication Data

US 2024/0030687 A1 Jan. 25, 2024

(30) Foreign Application Priority Data

Jul. 20, 2022 (FR) ...................................... 2207455

(51) Int. Cl.
*H01T 4/16* (2006.01)
*H01T 21/00* (2006.01)

(52) U.S. Cl.
CPC ................ *H01T 4/16* (2013.01); *H01T 21/00* (2013.01)

(58) Field of Classification Search
CPC ......... H01T 13/50; H01T 13/40; H01T 13/41; H01T 19/02; H01T 21/06; H01T 21/00; H01T 21/02; H01T 4/04; H01T 4/10; H01T 4/02; H01T 4/06; H01T 4/08; H01T 4/20
See application file for complete search history.

(56) References Cited

U.S. PATENT DOCUMENTS

| | | | | |
|---|---|---|---|---|
| 4,142,220 | A | 2/1979 | Lundsgaard | |
| 2011/0292557 | A1 * | 12/2011 | Penwell | H01R 24/48 361/118 |
| 2022/0200245 | A1 * | 6/2022 | Poterala | H01T 4/06 |

FOREIGN PATENT DOCUMENTS

| | | | |
|---|---|---|---|
| EP | 1808938 | A2 | 7/2007 |
| FR | 2404296 | A1 | 4/1979 |
| JP | H0864335 | A | 3/1996 |
| KR | 200339853 | Y1 | 1/2004 |
| WO | 2011150087 | A2 | 12/2011 |

OTHER PUBLICATIONS

International Search Report with English translation and Written Opinion for FR2207455 mailed Mar. 7, 2023.

* cited by examiner

*Primary Examiner* — Bryan R Perez
(74) *Attorney, Agent, or Firm* — Notaro, Michalos & Zaccaria P.C.

(57) ABSTRACT

A protection device against pulsed currents intended to transmit signals having frequencies lying in a transmission frequency band. The protection device has a signal conduction path and a shielding disposed around the signal conduction path. The signal conduction path has two spark gaps mounted in series and an inductor element linking a portion of the signal conduction path situated between the spark gaps. The inductor element is linked to the shielding. The protection device is configured as a high-pass filter allowing passage over the signal conduction path of the signals having frequencies lying within the transmission frequency band.

15 Claims, 6 Drawing Sheets

PROTECTION DEVICE AGAINST PULSED CURRENTS

FIELD

The invention relates to the field of spark gap surge arrestors for protection against overvoltages and overcurrents in electrical systems, in particular coaxial cable radiofrequency signal transmission systems.

BACKGROUND

A radiofrequency coaxial cable is a transmission line for radiofrequency signals (i.e. frequencies of electromagnetic waves lying between 3 kHz and 300 GHz) composed of two concentric conductors, the central core and the peripheral shielding, separated by a dielectric insulation.

The electronic devices which receive radiofrequency signals (RF) from coaxial cables are particularly subject to electrical overvoltages and overcurrents. The radiofrequency coaxial cables are generally suspended above the ground, fixed to electrical posts or to other structures, over long distances, where they are susceptible to being struck by lightning.

Lightning is characterized by a pulsed discharge current of peak high intensity with a rise time of the order of a microsecond comprising dominant components at lower frequencies than the radiofrequency signals to be transmitted. Typically, the lightning can provoke overvoltages of several millions of volts and overcurrents of thousands of amperes. Now, radiofrequency equipment is not designed to withstand such transient overvoltages and overcurrents.

To protect such radiofrequency equipment, WO 2018/127650 discloses spark gap surge arrestors mounted in parallel in the transmission line, between the central core and the shielding of the coaxial cable, to carry the flow of the high pulsed currents. A spark gap is an electrical component which, when the transmission line is in normal operation, that is to say in the absence of overvoltage and/or of overcurrent, exhibits a very high insulation resistance, that can be considered as almost infinite. When subjected to a transient overvoltage and/or overcurrent, the spark gap sparks over suddenly and becomes conductive with a very low impedance. The spark gap can then be likened to a short-circuit thus making it possible to divert to the earth via the peripheral shielding a strong discharge current corresponding to the transient overvoltage and/or overcurrent. It is thus possible to protect the radiofrequency equipment situated downstream of the spark gap against the pulsed currents.

However, because of the capacitive effect of spark gaps, such spark gap surge arrestors can have functionally narrow frequency ranges and a limited admissible maximum frequency. Furthermore, the ferromagnetic materials used in the surge arrestors can induce undesirable signals due to the effects of the modulation between several transmitted carrier waves. This passive intermodulation phenomenon (abbreviated PIM) degrades the transmission quality of the radiofrequency signals.

WO 2011/150087 discloses a protection device against the overvoltages and overcurrents for a coaxial communication system, which comprises capacitors to block the low-frequency components.

SUMMARY

One idea on which the invention is based is to produce a protection device for radiocommunication equipment against pulsed currents that is at the same time compact and capable of transmitting radiofrequencies over a wide range of operating frequencies without degradation in the transmission line.

According to one embodiment, the invention provides a protection device against the pulsed currents intended to transmit signals having frequencies lying in a transmission frequency band, the protection device comprising a signal conduction path and a shielding disposed around the signal conduction path, the signal conduction path comprising:

two spark gaps mounted in series; and an inductor element linking a portion of the conduction path situated between the spark gaps to said shielding;

such that the protection device is configured as a high-pass filter allowing passage over the signal conduction path of the signals having frequencies lying in the transmission frequency band.

By virtue of these features, the protection device can, on the one hand, in the absence of overvoltages and overcurrents, block the continuous current flows and the low frequencies—typically the frequencies of the electromagnetic waves lying between 3 Hz and 1 MHz—while allowing passage of the radiofrequency signals over a wide range of operating frequencies and, on the other hand, when overvoltages or overcurrents are present, divert the undesirable pulsed currents, for example generated by lightning, to an earthing system via the inductor element. Indeed, the inductor element has a high impedance for the high frequencies but a low impedance for the low frequencies which constitute most of the energy spectrum of the lightning current.

According to embodiments, such a protection device can comprise one or more of the following features.

According to one embodiment, the protection device further comprises at least one capacitive element mounted in parallel with one of the spark gaps on the signal conduction path, for example two capacitive elements respectively mounted in parallel with each of the spark gaps.

Thus, when the specific capacitance of the spark gaps is insufficient, the addition of one or more capacitive elements makes it possible to adjust the decoupling of the low frequencies by setting the cut off frequency of the protection device.

According to one embodiment, said at least one capacitive element comprises or consists of a capacitor having plates separated by a dielectric insulation, for example of polytetrafluoroethylene.

As a variant, materials other than polytetrafluoroethylene can be used to separate the conductive plates.

According to one embodiment, the signal protection path comprises at least one pair of electrodes, each electrode of the pair of electrodes comprising a first surface and a second surface adjacent to the first surface. The first surfaces of the pair of electrodes can be positioned facing one another and said spark gap mounted between the first surfaces of the pair of electrodes. The second surfaces of the pair of electrodes can be positioned facing one another and said dielectric insulation mounted between the second surfaces of the pair of electrodes, such that the second portions of the pair of electrodes form the plates of the capacitor.

In one embodiment, each of the electrodes of the or of each pair of electrodes comprises a blind bore, the first surface being positioned at the bottom of the blind bore such that a meeting of said blind bores forms an inner space housing said spark gap, the second surface being positioned around the blind bore.

Thus, the arrangement of the pair of electrodes and of the spark gaps makes it possible to produce a compact protection device.

According to one embodiment, the protection device has an elongate form in a longitudinal direction. According to one embodiment, each of the electrodes of the pair of electrodes has a form of revolution about an axis of revolution parallel to the longitudinal direction.

According to one embodiment, two abovementioned pairs of electrodes are provided, namely a respective pair of electrodes for each of the two spark gaps.

According to one embodiment, the inductor element has a central part and a peripheral part, the central part being in electrical contact with one said electrode of the pair of electrodes, the peripheral part being in electrical contact with the shielding. For example, the central part is in electrical contact with one said electrode of each of the two abovementioned pairs of electrodes.

According to one embodiment, the inductor element comprises a coil having a flat spiral form.

In particular, the coil can be a circular flat spiral. As a variant, the spiral coil can have a polygonal form (e.g. square, hexagonal, octagonal, etc.) or any other form.

According to one embodiment, at least one of the two spark gaps comprises:

- an insulating jacket delimiting an inner space and having two apertures respectively at two opposite ends of the inner space;
- two spark-gap electrodes closing the two apertures of the inner space in a gas-tight manner, each spark-gap electrode comprising an inner part housed in the inner space of the insulating jacket and an outer part accessible from the outside of the insulating jacket, the inner part having an end surface, the end surfaces of said spark-gap electrodes being positioned facing one another so as to delimit between them an air gap; and
- an inert gas captive in the inner space of the insulating jacket.

According to one embodiment, the insulating jacket is of ceramic.

According to one embodiment, the seal-tightness between the spark-gap electrodes and the insulating jacket is produced by brazing.

According to one embodiment, the ends of the insulating jacket comprise a layer of an alloy of iron and nickel, the seal-tightness between the spark-gap electrodes and the insulating jacket being produced by brazing.

Thus, since the alloy of iron and nickel exhibits a coefficient of expansion very close to the coefficient of expansion of ceramic, the layer and the insulating jacket expand and contract similarly such that the forces that they exert on one another in contraction or in expansion do not risk damaging the insulating jacket.

The reduction of noise in the coaxial cable radiofrequency data transmission systems is limited by the passive intermodulation, i.e. the intermodulation distortions resulting from non-linear interferences generated in passive components of the system. The ferromagnetic materials, such as iron and nickel, are deemed to exhibit nonlinear characteristics which contribute to the passive intermodulation.

According to one embodiment, the spark-gap electrodes are made of a metal chosen from the group composed of copper and alloys thereof.

Thus, the protection device exhibits extremely low passive intermodulation.

According to one embodiment, the gas captive in the insulating jacket is chosen from the group composed of argon, neon, hydrogen, nitrogen, rare gases and mixtures of these gases. This makes it possible to finely set the spark-over conditions of the spark gap.

According to one embodiment, the protection device further comprises two terminal connectors for coaxial cable, each terminal connector comprising a peripheral conductive portion intended to be linked to the peripheral shielding of a coaxial cable and a central conductive portion intended to be linked to the central core of a coaxial cable, wherein the signal conduction path is in electrical contact with the central conductive portion of each of the terminal connectors, and wherein the shielding is in electrical contact with the peripheral conductive portion of each of said terminal connectors.

According to embodiments, the terminal connector can be produced in a standardised type chosen from the list consisting of SMA, BNC, TNC, NEX10, N, 4,3-10 and 7/16.

BRIEF DESCRIPTION OF THE FIGURES

The invention will be better understood and other aims, details, features and advantages thereof will become more clearly apparent from the following description of several particular embodiments of the invention, given purely in an illustrative and nonlimiting manner, with reference to the attached drawings.

DETAILED DESCRIPTION

The embodiments hereinbelow are described in relation to a protection device intended to limit the transient overvoltages and overcurrents in a coaxial cable radiofrequency signal transmission system.

Figure 1:
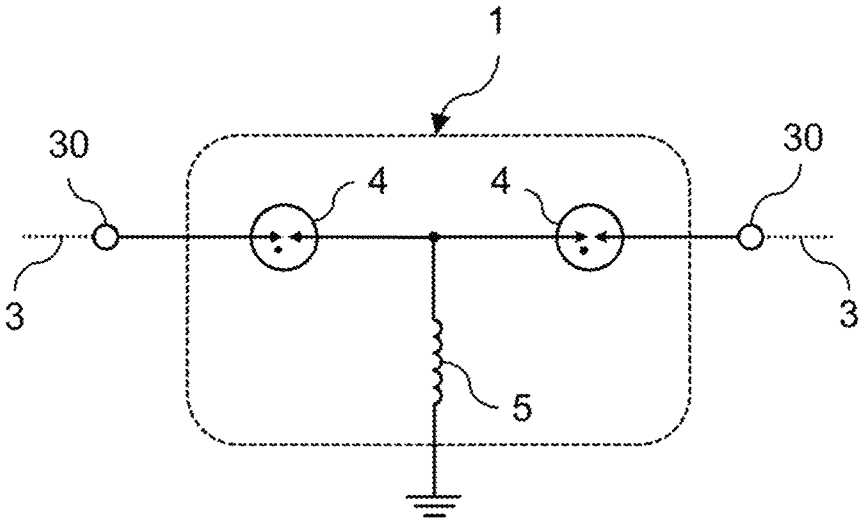
FIG. 1 is a schematic representation of a coaxial cable radiofrequency signal transmission system comprising a protection device according to a first embodiment of the invention.

Referring to FIG. 1, a protection device 1 is installed on a coaxial cable bidirectional transmission line 3, for example used for the reception or the transmission of radiofrequency signals lying within a given operating frequency band. In particular, the peripheral shielding of the coaxial cable can serve as earth potential. The protection device 1 is generally incorporated in a coaxial coupling comprising two terminal connectors 30 intended to be interposed on the coaxial cable transmission line 3. More details on such a coaxial coupling can be found in the patent application FR-A-3061813.

The coaxial cable transmission line 3 can belong to a telecommunication network incorporating equipment to be protected (not represented), for example radiocommunication equipment in CDMA, GSM/UMTS, WiMAX or TETRA base stations.

Some events can provoke the flow of high pulsed currents on the coaxial cable transmission line 3, which take the form of abrupt overvoltages and overcurrents over a brief instant. Now, such increases in the voltage and/or the intensity of the electrical current can cause transmission interruptions, even damage the equipment linked to the coaxial cable transmission line 3.

To limit the transient overvoltages and overcurrents, the protection device 1 diverts to the earth, via the peripheral shielding, the pulsed current discharge induced in the coaxial cable transmission line 3.

The protection device 1 comprises a signal conduction path arranged electrically on the central core of the coaxial cable transmission line 3 and a shielding in electrical contact with the peripheral shielding of the coaxial cable transmission line 3.

The signal conduction path comprises two spark gaps 4 mounted in series, and an inductor 5 linking a portion of the signal conduction path situated between the two spark gaps 4 to the shielding.

In normal operating conditions, i.e. in the absence of transient overvoltages or overcurrents, the radiofrequency signals are transmitted without loss of integrity in the coaxial cable transmission line 3.

On the one hand, the spark gaps 4 have very low capacitance values such that the protection device 1 operates as a high-pass filter which blocks the direct current flows and the low frequencies but allows the radiofrequency signals to pass. In dimensioning, for the typical characteristic impedance of 50 Ω, spark gaps 4 exhibit capacitance values of the order of 5.3 pF and an inductance 5 exhibiting inductance values of the order of 6.6 nH, the protection device 1 allows a cut off frequency of the order of 600 MHz.

Figure 2:
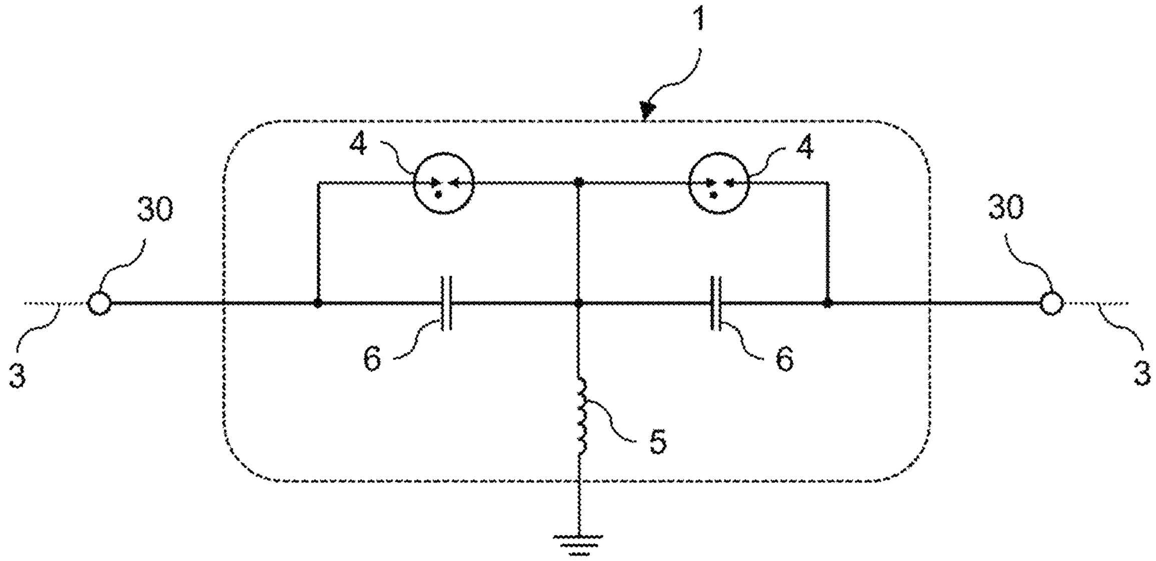
FIG. 2 is a schematic representation similar to FIG. 1 comprising a protection device according to a second embodiment of the invention.

As a variant, if the capacitance values of the spark gaps 4 are too low to be compatible with the operating frequency band of the radiofrequency signal transmission system, capacitive elements 6 can be mounted in parallel with the coaxial cable transmission line 3, as represented in FIG. 2. In dimensioning, for the typical characteristic impedance of 50 Ω, a pair of spark gaps 4 exhibiting capacitance values of the order of 0.7 pF and a pair of capacitive elements 6 exhibiting capacitance values of the order of 63 pF and an inductance 5 exhibiting inductance values of the order of 79.6 nH, the protection device 1 allows a cut off frequency of the order of 50 MHz.

On the other hand, the inductance 5 is configured to exhibit a very high impedance to the radiofrequency signals, in particular in the operating frequency band of the transmission system such that the protection device 1 insulates the central core of the coaxial cable transmission line 3 from the peripheral shielding serving as a ground potential.

Conversely, in the event of transient overvoltages or overcurrents induced in the central core of the coaxial cable transmission line 3, for example under the effect of lightning, the pulsed current generated is diverted to the peripheral shielding serving as a ground potential, which makes it possible to protect the equipment linked to the coaxial cable transmission line 3.

For example, when lightning strikes the coaxial cable transmission line 3, a strong pulsed current characterized by a direct current flow and low-frequency electromagnetic waves is propagated along the coaxial cable transmission line 3 to reach the signal conduction path of the protection device 1. One of the two spark gaps 4 is subjected to a transient overvoltage whose value exceeds a certain threshold corresponding to a spark-over voltage of the spark gap 4. Advantageously, the spark-over voltage is chosen to be a little greater than the nominal operating voltage of the coaxial cable transmission line 3. The spark gap 4 then sparks over suddenly, and becomes conductive with a very low resistance such that it behaves as a closed switch. Downstream of the spark gap 4, the inductor 5, which has a zero impedance in terms of direct current and very low impedance at low frequencies, provokes a short circuit diverting the pulsed current generated by the lightning to the shielding.

Figure 3:
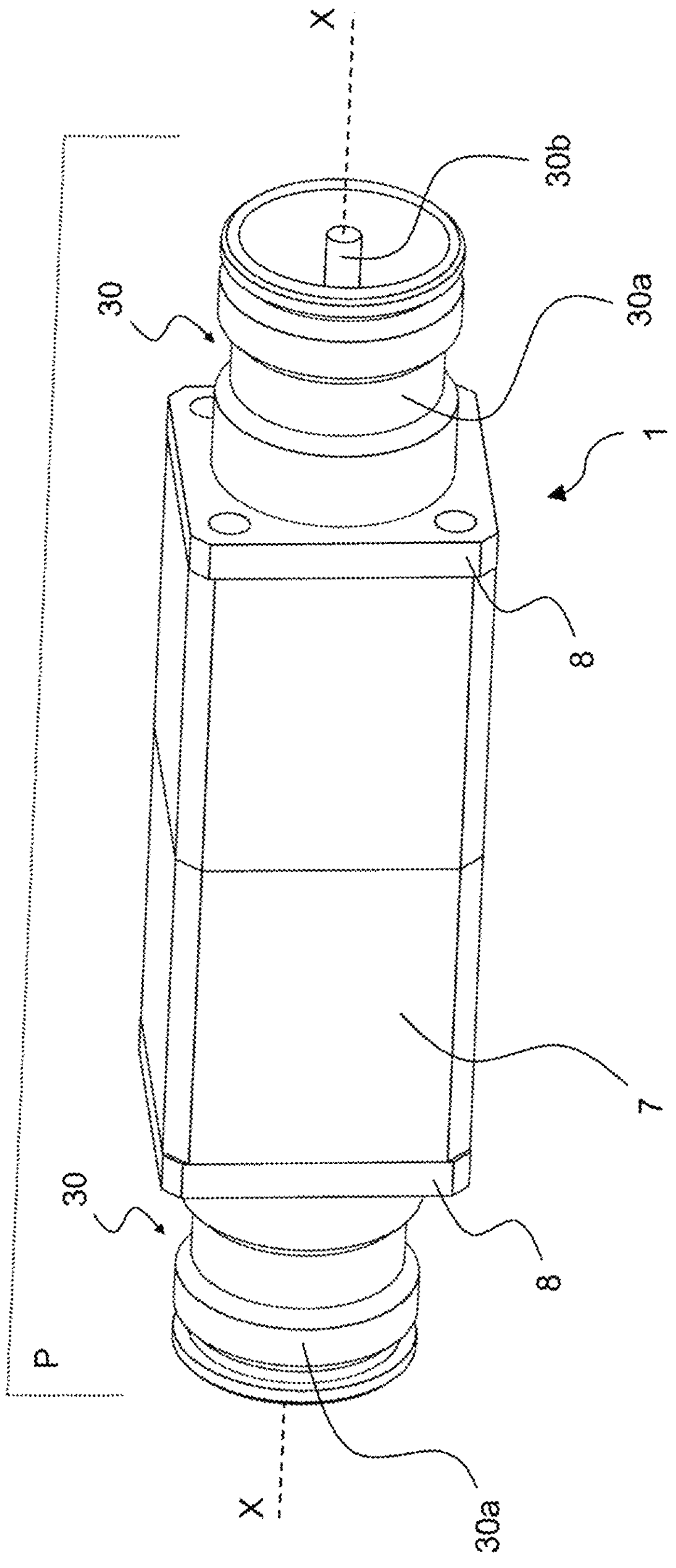
FIG. 3 is a perspective schematic view of the protection device according to the second embodiment of the invention.

Referring to FIG. 3, the protection device 1 takes the form of a rectangular body 7, for example made of brass, developing along a longitudinal axis X between two ends 8. The body 7 forms the shielding of the protection device 1. At each end 8, the protection device 1 comprises a terminal connector 30 to couple the protection device 1 to the coaxial cable transmission line 3. The terminal connectors 30 are of generally cylindrical form about the longitudinal axis X. Each terminal connector 30 comprises a peripheral conductive portion 30*a* intended to be linked to the peripheral shielding of the coaxial cable 3 and a central conductive portion 30*b* intended to be linked to the central core of the coaxial cable 3. The body 7 forming the shielding of the protection device 1 is in electrical contact with the peripheral conductive portion 30*a* of each of the terminal connectors 30.

Figure 4:
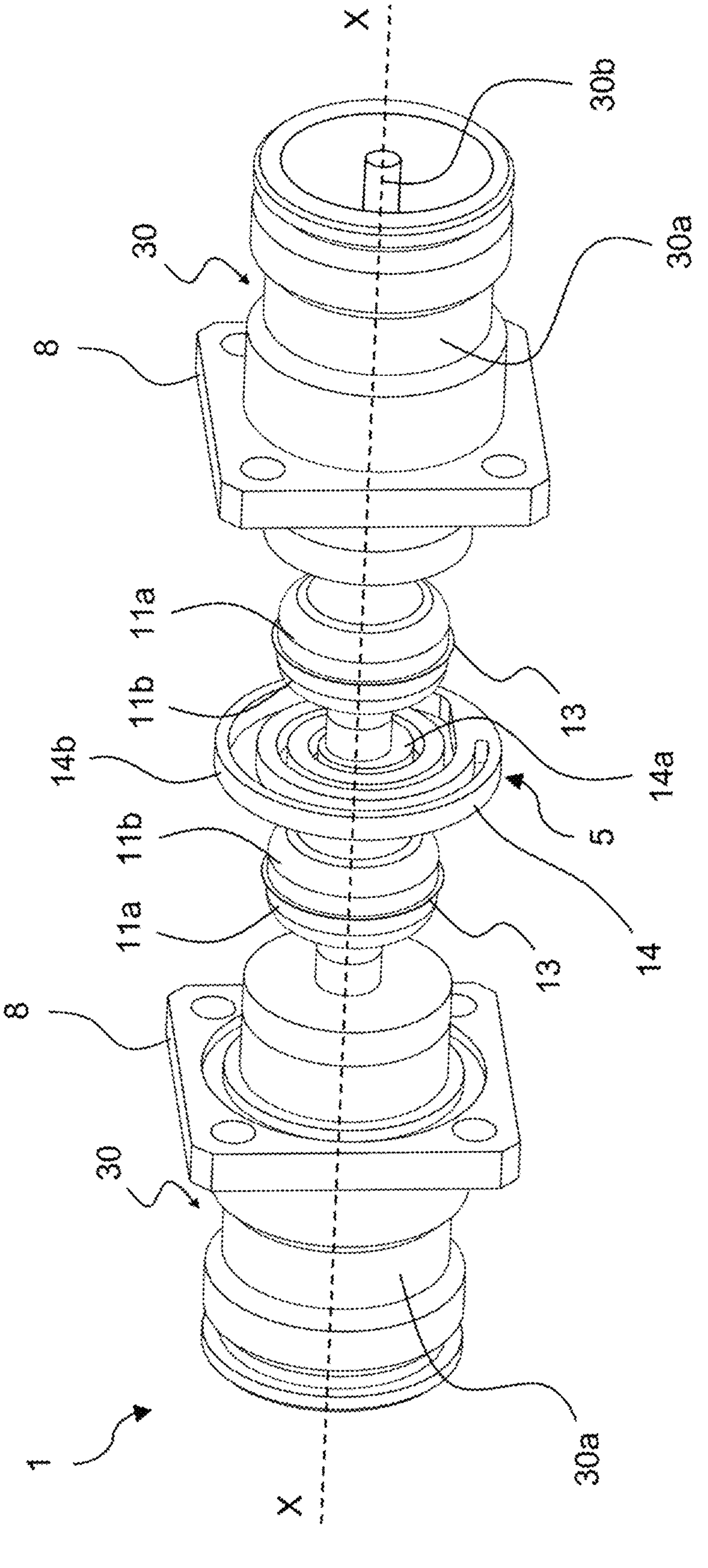
FIG. 4 is a perspective schematic view of the protection device represented in FIG. 3, the body being omitted.
Figure 5:
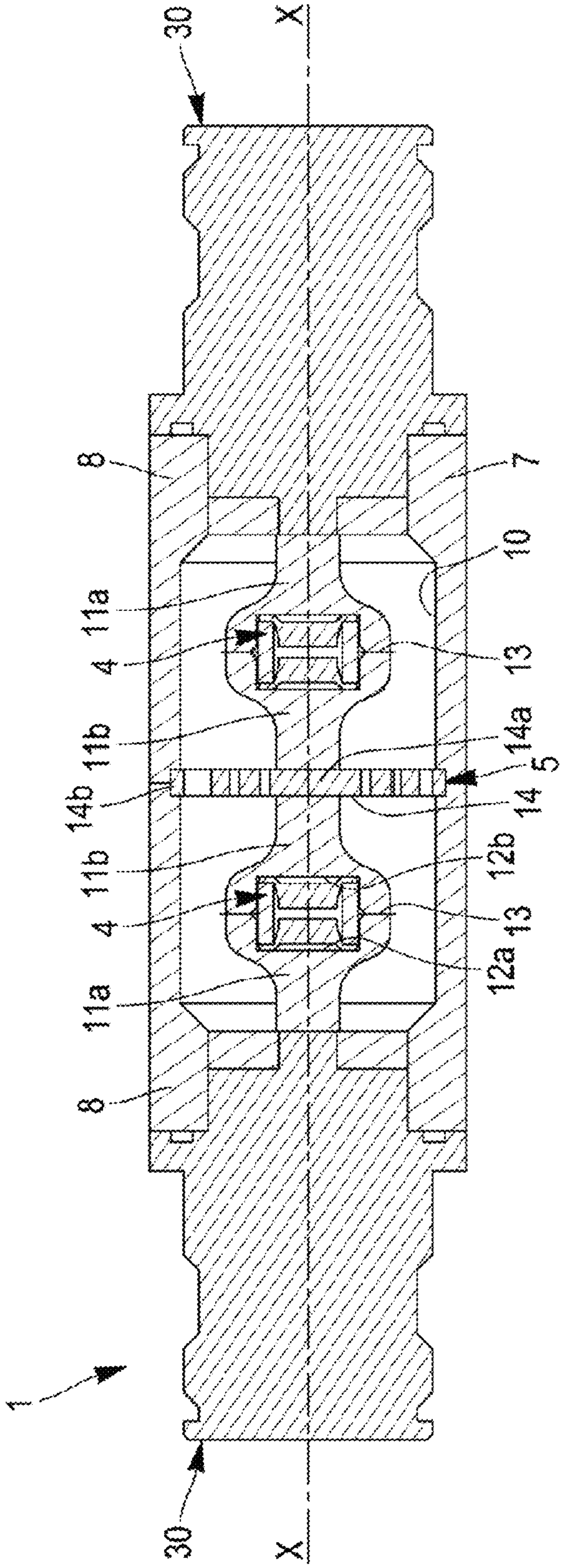
FIG. 5 is a schematic view in cross-section on a plane at right angles to the longitudinal axis of the protection device represented in FIG. 3.

Referring to FIGS. 4 and 5, the body 7 of the protection device 1 is hollow and forms a cylindrical internal housing 10 for two pairs of electrodes 11*a*, 11*b*, two spark gaps 4 and an inductor 5. The pairs of electrodes 11*a*, 11*b*, the spark gaps 4, the inductor 5 and the terminal connectors 30 are coaxial.

Each electrode of a pair of electrodes 11*a*, 11*b* comprises a body with symmetry of revolution of flared form between two opposite ends. One end of the body of the electrode has a second electrode surface comprising a blind bore 12*a*, 12*b* with a flat bottom. The flat bottom forms the first electrode surface. In the internal housing 10, the first and second electrodes of a pair of electrodes 11*a*, 11*b* are arranged so as to position the first and the second electrode surface of the first electrode 11*a* facing, respectively, the first and the second electrode surface of the second electrode 11*b*. The meeting of the bores 12*a*, 12*b* of the first and second electrodes 11*a*, 11*b* forms an inner space dimensioned to accommodate a spark gap 4. Each pair of electrodes 11*a*, 11*b* thus grips a spark gap 4 in electrical contact with the first electrode surface at the bottom of the bores 12*a*, 12*b*.

A flat annular seal 13 made of polytetrafluoroethylene is inserted between the facing electrode surfaces of the first and second electrodes 11*a*, 11*b*. Each electrode surface forms the conductive plate of a capacitor mounted, by construction, in parallel with the spark gap 4 gripped in the pair of electrodes 11*a*, 11*b*. As a variant, materials other than polytetrafluoroethylene can be used to separate the conductive plates.

Each pair of electrodes 11*a*, 11*b* is housed in a respective part of the internal housing 10 representing half the internal housing 10. For each pair of electrodes 11*a*, 11*b*, the end without the bore 12*a* of the first electrode 11*a* is in electrical contact with the central conductive portion 30*b* of a terminal connector 30, and the end without a bore 12*b* of the second electrode 11*b* is in electrical contact with the inductor 5. The detail of the terminal connectors 30 is not represented in FIG. 5.

The inductor 5 comprises or consists of a circular flat spiral coil 14 having a central part 14*a* and a peripheral part 14*b*. As a variant, the spiral coil 14 can have a polygonal form (e.g. square, hexagonal, octagonal, etc.) or any other form. The spiral coil 14 is positioned in the middle of the internal housing 10 in the plane at right angles to the longitudinal axis X. The central part is in electrical contact with the second electrode of each pair of electrodes (as indicated above) while the peripheral part is in electrical contact with the body 7 of the protection device 1. The spiral coil 14 is thus mounted between the two spark gaps 4 and linked via the body 7 forming the shielding of the protection device 1 to the peripheral shielding of the coaxial cable 3.

Thus, the central conductive portion 30*b* of the terminal connectors 30, the pairs of electrodes 11*a*, 11*b* and the central portion 14*a* of the spiral coil 14 form the signal conduction path of the protection device 1.

Advantageously, to limit the phenomena of passive intermodulation of the protection device 1, the spiral coil 14 is made from a non-magnetic metal or from an alloy of non-magnetic metals, preferably an alloy of copper and of beryllium. Indeed, the ferromagnetic metals, such as iron or nickel, generally used in the known spark gap coaxial surge arrestors, exhibit nonlinear characteristics which generate distortions by intermodulation of the radiofrequency signals.

Figure 6:
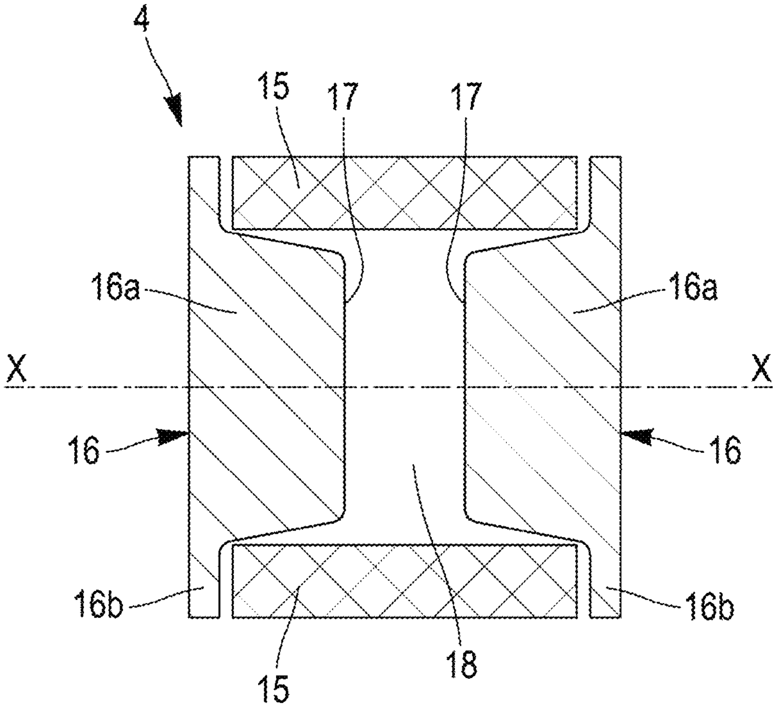
FIG. 6 is a schematic view of a spark gap that can be used in the protection device represented in FIG. 3, according to the first embodiment.
Figure 7:
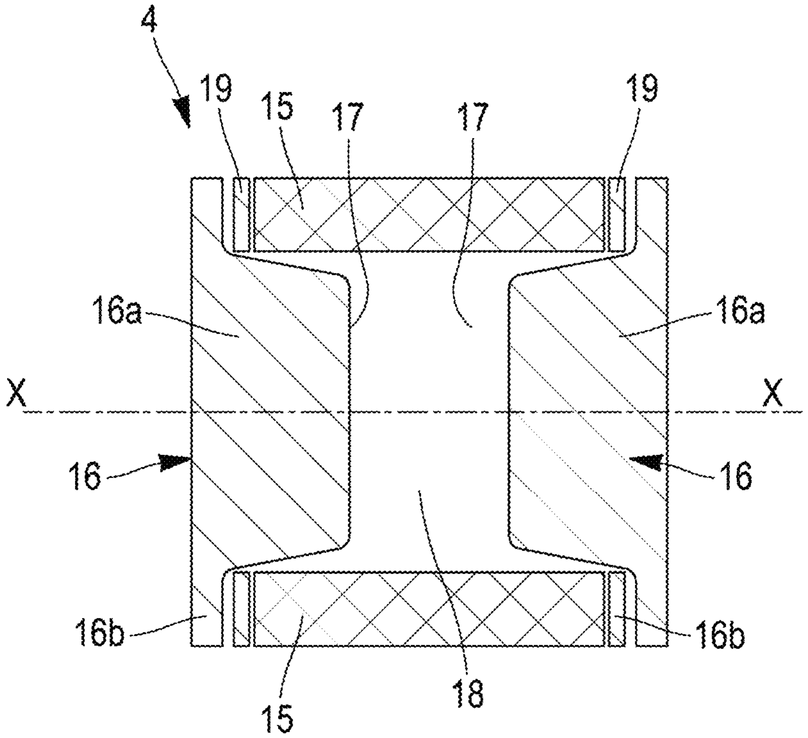
FIG. 7 is a schematic view similar to that of FIG. 6, according to a second embodiment.

Referring to FIGS. 6 and 7, the spark gap 4 comprises an insulating jacket 15 of hollow cylindrical form developing between two ends along the longitudinal axis X. The insulating jacket 15 delimits an inner space of the spark gap emerging on two apertures situated respectively at the two opposite ends of the inner space of the spark gap 4. Advantageously, the insulating jacket 15 is made of ceramic.

The spark gap 4 also comprises two spark-gap electrodes 16. Advantageously, the spark-gap electrodes are made of copper or from an alloy of copper. Each spark-gap electrode 16 comprises an inner part 16*a* housed in the inner space of the insulating jacket and an outer part 16*b* protruding outside of the insulating jacket. As illustrated in FIG. 5, the outer part 16*b* is in electrical contact with the flat bottom of the bore 12*a*, 12*b* of an electrode 11*a*, 11*b* of the protection device 1. The inner part 16*a* has a flat end surface 17.

In the inner space of the spark gap 4, the end surfaces 17 of the two spark-gap electrodes 16 are positioned facing one another so as to delimit between them an air gap 18. The distance separating the end surfaces 17 of the spark-gap electrodes 16 makes it possible to define the spark-over voltage. When the voltage at a spark-gap electrode 16 reaches the spark-over voltage, an electrical current occurs between the spark-gap electrodes 16, forming an electrical arc. The spark gap 4 becomes conductive with a very low resistance which allows the passage of the pulsed current, then conveyed by the spiral coil 14 to the shielding of the protection device 1.

In order to limit the holding time or to stop the electrical arc between the spark-gap electrodes 16, an inert gas is captive in the insulating jacket 15, which includes the air gap 18. Such an inert gas is for example argon, neon, hydrogen, nitrogen, a rare gas, or a mixture of these gases. This inert gas is kept in the spark gap 4 at low pressure, for example at a pressure of 50 mbar. This low pressure affects the value of the spark-over voltage of the spark gap 4. The gas can be captive in the spark gap 4 at different pressures, depending on the spark-over voltage desired for the spark gap 4.

In order to ensure that the inert gas is captive in the spark gap 4, the inner space is sealed. As illustrated in FIG. 6, the seal-tightness of the inner space can be produced by hermetically sealing, through a rapid thermal cycle, the outer part 16*b* of the spark-gap electrode 16 on an open end of the insulating jacket 15. Advantageously, for a spark-gap electrode 16 made of copper and an insulating jacket 15 made of ceramic, the seal-tightness can be produced by a thermal cycle of 30 min at a maximum temperature of 1120 K.

As a variant, as illustrated in FIG. 7, a metal layer 19 can be used to cover the ends of the insulating jacket 15. The seal-tightness between the layer 19 and the outer part 16*b* of the spark-gap electrode 16 and between the layer 19 and the end of the insulating jacket 15 is for example produced by brazing. Advantageously, when the insulating jacket 15 is made of ceramic, the layer 19 is made of an alloy of iron and nickel, which exhibits an expansion coefficient very close to the expansion coefficient of ceramic. Thus, the layer 19 and the insulating jacket 15 expand and contract similarly such that the forces that they exert on one another in contraction or in expansion do not risk damaging the insulating jacket 15.

EXAMPLE

An example of the protection device 1 as described with reference to FIGS. 3 to 6 has been implemented with the following dimensioning:

- characteristic impedance of the order of 50 Ω;
- two spark gaps 4 each having a capacitance of the order of 0.7 pF;
- two capacitive elements 6 each having a capacitance of the order of 30.5 pF;
- an inductor 5 having an inductance value of the order of 28.5 nH.

The return loss, abbreviated RL, measured in decibels—quantifies the power loss of the signal reflected by a discontinuity in a transmission line. For a given frequency, the greater the return loss, the higher the performance levels of the transmission line. In particular, for a protection device intended to limit the transient overvoltages and overcurrents in a coaxial cable radiofrequency signal transmission line, losses of 20 dB or more are desirable in the transmission frequency band.

Figure 8:
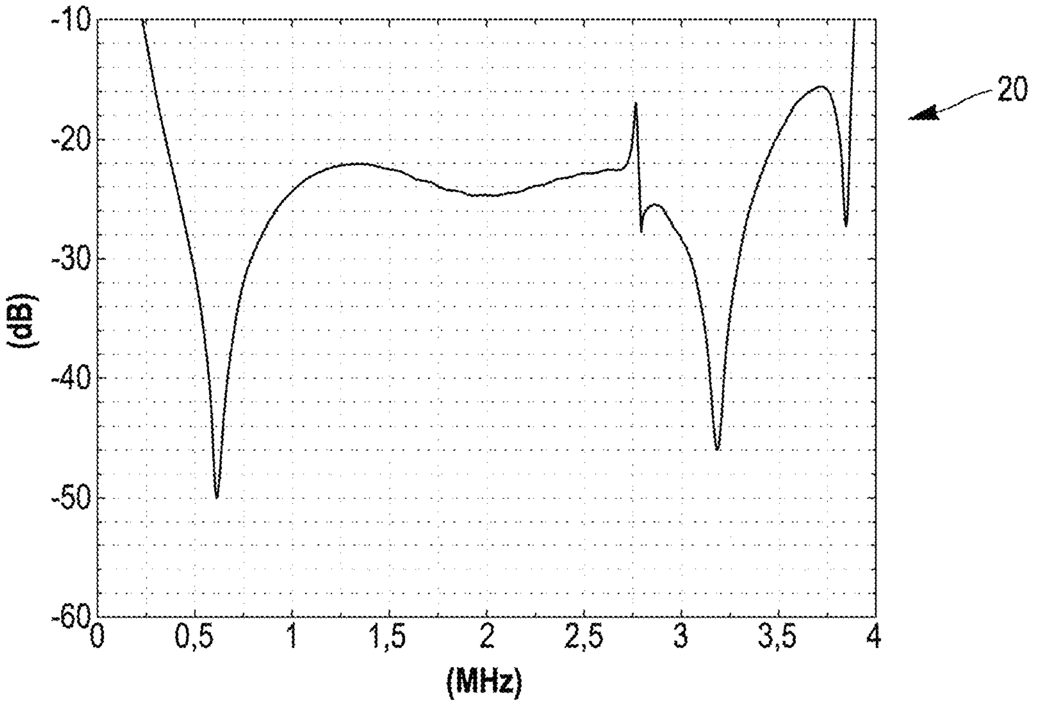
FIG. 8 is a graphic representation of the return loss as a function of the frequency of the protection device according to the second embodiment of the invention.

In FIG. 8, the graph 20 represents the return loss (dB) as a function of the frequency (MHz). The protection device according to the example exhibits a return loss varying between 20 dB and 50 dB in a transmission frequency band lying between 0.4 GHz and 2.7 GHz.

The insertion loss, abbreviated IL, measured in decibels—quantifies the power loss of the input signal with respect to that of the output signal resulting from the insertion of a device in a transmission line. For a given frequency, the lower the insertion loss, the higher the performance levels of the transmission line. In particular, for a protection device intended to limit the transient overvoltages and overcurrents in a coaxial cable radiofrequency signal transmission line 3, losses of 0.1 dB or less are desirable in the transmission frequency band.

Figure 9:
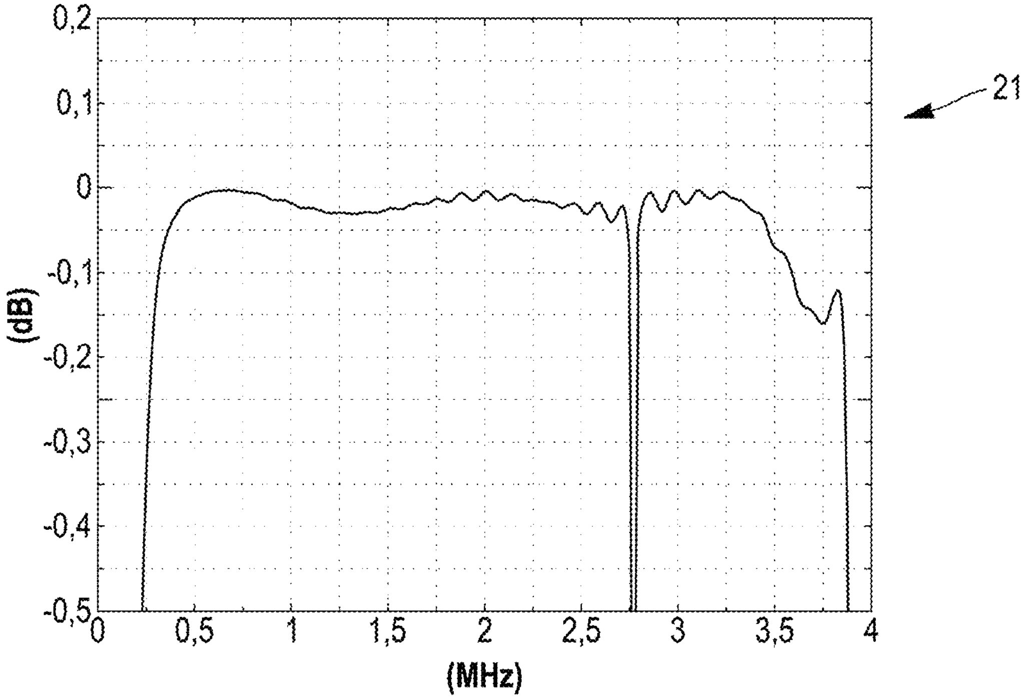
FIG. 9 is a graphic representation of the insertion loss as a function of the frequency of the protection device according to the second embodiment of the invention.

In FIG. 9, the graph 21 represents the variation of the insertion loss (dB) as a function of the frequency (MHz). The protection device according to the example exhibits an insertion loss varying between 0 dB and 0.05 dB in a transmission frequency band lying between 0.4 GHz and 2.7 GHz.

Although the invention has been described in relation to several particular embodiments, it is perfectly clear that it is in no way limited thereto and that it encompasses all the technical equivalents of the means described and the combinations thereof if they fall within the context of the invention.

The use of the verb "comprise" or "include" and its conjugate forms does not preclude the presence of elements or steps other than those stated in a claim.

In the claims, any reference symbol between parentheses should not be interpreted as a limitation on the claim.

What is claimed is:

1. A protection device (1) against pulsed currents intended to transmit signals having frequencies lying within a transmission frequency band, the protection device (1) comprising a signal conduction path and a shielding disposed around the signal conduction path, the signal conduction path comprising:

two spark gaps (4) mounted in series; and an inductor element (5) linking a portion of the signal conduction path situated between the two spark gaps (4) to said shielding;

such that the protection device (1) is configured as a high-pass filter allowing passage over the signal conduction path of the signals having frequencies lying within the transmission frequency band, wherein a cut off frequency of the protection device (1) is higher than 1 MHz.

2. The protection device (1) according to claim 1, further comprising at least one capacitive element (6) mounted in parallel with one said spark gap (4) on the signal conduction path.

3. The protection device (1) according to claim 2, wherein said at least one capacitive element (6) comprises a capacitor having plates separated by a dielectric insulator (13).

4. The protection device (1) according to claim 1, wherein the inductor element (5) comprises a coil (14) having a flat spiral form.

5. The protection device (1) according to claim 1, further comprising two terminal connectors (30) for coaxial cable (3), each terminal connector (30) comprising a peripheral conductive portion (30*a*) intended to be linked to the peripheral shielding of a coaxial cable (3) and a central conductive portion (30*b*) intended to be linked to the central core of a coaxial cable (3), wherein the signal conduction path is in electrical contact with the central conductive portion (30*b*) of each of the terminal connectors (30), and wherein the shielding is in electrical contact with the peripheral conductive portion (30*a*) of each of said terminal connectors (30).

6. A protection device (1) against pulsed currents intended to transmit signals having frequencies lying within a transmission frequency band, the protection device (1) comprising a signal conduction path and a shielding disposed around the signal conduction path, the signal conduction path comprising:

two spark gaps (4) mounted in series;

an inductor element (5) linking a portion of the signal conduction path situated between the two spark gaps (4) to said shielding; and at least one capacitive element (6) mounted in parallel with one said spark gap (4) on the signal conduction path, wherein said at least one capacitive element (6) comprises a capacitor having plates separated by a dielectric insulator (13);

such that the protection device (1) is configured as a high-pass filter allowing passage over the signal conduction path of the signals having frequencies lying within the transmission frequency band, wherein the signal protection path comprises at least one pair of electrodes, each electrode of the pair of electrodes comprising a first surface and a second surface adjacent to the first surface, wherein the first surfaces of the pair of electrodes are positioned facing one another and said spark gap is mounted between the first surfaces of the pair of electrodes, wherein the second surfaces of the pair of electrodes are situated facing one another and said dielectric insulation being mounted between the second surfaces of the pair of electrodes, in such a way that the second portions of the pair of electrodes form the plates of the capacitor.

7. The protection device (1) according to claim 6, wherein each of the electrodes of the pair of electrodes comprises a blind bore, the first surface being positioned at the bottom of the blind bore, such that a meeting of said blind bores forms an inner space housing said spark gap (4), the second surface being positioned around the blind bore.

8. The protection device (1) according to claim 6, having an elongate form in a longitudinal direction, wherein each of the electrodes of the pair of electrodes has a form of revolution about an axis of revolution parallel to the longitudinal direction.

9. The protection device (1) according to claim 6, wherein the inductor element (5) has a central part (14*a*) and a peripheral part (14*b*), the central part (14*a*) being in electrical contact with one said electrode of the pair of electrodes, the peripheral part (14*b*) being in electrical contact with the shielding.

10. A protection device (1) against pulsed currents intended to transmit signals having frequencies lying within a transmission frequency band, the protection device (1) comprising a signal conduction path and a shielding disposed around the signal conduction path, the signal conduction path comprising:

two spark gaps (4) mounted in series; and an inductor element (5) linking a portion of the signal conduction path situated between the two spark gaps (4) to said shielding;

such that the protection device (1) is configured as a high-pass filter allowing passage over the signal conduction path of the signals having frequencies lying within the transmission frequency band, wherein a cut off frequency of the protection device (1) is higher than 1 MHZ, and wherein at least one of the two spark gaps (4) comprises:

an insulating jacket (15) delimiting an inner space and having two apertures respectively at two opposite ends of the inner space;

two spark-gap electrodes (16) closing the two apertures of the inner space in a gastight manner, each spark-gap electrode comprising an inner part (16*a*) housed in the inner space of the insulating jacket (15) and an outer part (16*b*) accessible from the outside of the insulating jacket (15), the inner part (16*a*) having an end surface (17), the end surfaces (17) of said spark-gap electrodes (16) being positioned facing one another so as to delimit between them an air gap (18); and an inert gas captive in the inner space of the insulating jacket (15).

11. The protection device (1) according to claim 10, wherein the insulating jacket (15) is made of ceramic.

12. The protection device (1) according to claim 10, wherein the seal-tightness between the spark-gap electrodes (16) and the insulating jacket (15) is produced by brazing.

13. The protection device according to claim 11, wherein the ends of the insulating jacket (15) comprise a layer (19) of an alloy of iron and nickel, the seal-tightness between the spark-gap electrodes (16) and the insulating jacket (15) being produced by brazing.

14. The protection device according to claim 10, wherein the spark-gap electrodes (16) are made of a metal chosen from the group composed of copper and alloys thereof.

15. The protection device (1) according to claim 10, wherein the gas captive in the insulating jacket (15) is chosen from the group composed of argon, neon, hydrogen, nitrogen, rare gases and mixtures of these gases.

* * * * *